United States Patent
Kim et al.

(10) Patent No.: US 10,405,389 B2
(45) Date of Patent: Sep. 3, 2019

(54) FLICKERLESS LED DRIVER DEVICE

(71) Applicant: YUYANG DNU CO., LTD., Hwaseong-si (KR)

(72) Inventors: Sangok Kim, Seoul (KR); Byungoh Kim, Suwon-si (KR); Dongsik Kim, Siheung-si (KR); Hyuncheol Shim, Ansan-si (KR)

(73) Assignee: YUYANG DNU CO., LTD. (KR)

( * ) Notice: Subject to any disclaimer, the term of this patent is extended or adjusted under 35 U.S.C. 154(b) by 0 days.

(21) Appl. No.: 15/958,309

(22) Filed: Apr. 20, 2018

(65) Prior Publication Data

US 2018/0279435 A1 Sep. 27, 2018

Related U.S. Application Data

(63) Continuation of application No. PCT/KR2016/011783, filed on Oct. 20, 2016.

(30) Foreign Application Priority Data

Oct. 21, 2015 (KR) .......................... 10-2015-0146500

(51) Int. Cl.
*H05B 33/08* (2006.01)
*H05B 37/02* (2006.01)
(Continued)

(52) U.S. Cl.
CPC ......... *H05B 33/0842* (2013.01); *H01F 27/28* (2013.01); *H05B 33/0812* (2013.01); *H05B 37/0209* (2013.01)

(58) Field of Classification Search
CPC .... H05B 33/08; H05B 33/0842; H05B 37/02; H05B 37/0209; H05B 37/0272;
(Continued)

(56) References Cited

U.S. PATENT DOCUMENTS 8,007,127 B2 8/2011 Kim et al.
2009/0310971 A1* 12/2009 Kim .................. H04B 10/1149
398/103
(Continued)

FOREIGN PATENT DOCUMENTS

JP 2010-170704 A 8/2010
JP 2012-243410 A 12/2012
(Continued)

OTHER PUBLICATIONS

U.S. Appl. No. 15/850,560, filed Dec. 21, 2017, Kim, et al.
U.S. Appl. No. 15/939,767, filed Mar. 29, 2018, Kim, et al.

*Primary Examiner* — Thai Pham
(74) *Attorney, Agent, or Firm* — Harness, Dickey & Pierce, P.L.C.

(57) ABSTRACT

A flickerless LED driver device includes a transformer having a primary coil for receiving an alternating-current (AC) voltage, and a secondary coil for generating a first induced voltage induced from the primary coil; a secondary coil circuit for receiving the first induced voltage and applying a first direct-current (DC) voltage to an LED module; a current sensor for sensing a driving current flowing through the secondary coil circuit from the secondary coil; a current controller for receiving a signal about the driving current and generating a control signal for controlling an emission current flowing through the LED module; and a ripple attenuator connected to the LED module to receive a visual light communication (VLC) signal and the control signal, control an emission current corresponding to the VLC signal to flow through the LED module, and suppress ripple of the emission current.

13 Claims, 3 Drawing Sheets

(51) Int. Cl.
*H04B 10/116* (2013.01)
*H01F 27/28* (2006.01)

(58) Field of Classification Search
CPC ....... H04B 10/00; H04B 10/116; F21V 23/00; F21V 23/02
See application file for complete search history.

(56) References Cited

U.S. PATENT DOCUMENTS

| | | | |
|---|---|---|---|
| 2011/0222849 A1* | 9/2011 | Han | H04B 10/1149 398/25 |
| 2016/0381751 A1* | 12/2016 | Bong | H05B 33/083 315/193 |
| 2017/0202062 A1* | 7/2017 | Choi | H05B 33/0854 |
| 2017/0258666 A1 | 9/2017 | Kim et al. | |
| 2017/0307382 A1 | 10/2017 | Kim et al. | |
| 2018/0065644 A1 | 3/2018 | Kim et al. | |
| 2018/0101875 A1 | 4/2018 | Kim et al. | |

FOREIGN PATENT DOCUMENTS

| | | | |
|---|---|---|---|
| JP | 2012243410 A | * | 12/2012 |
| KR | 20070096242 A | * | 10/2007 |
| KR | 10-2008-0028301 A | | 3/2008 |
| KR | 10-0948736 B1 | | 3/2010 |
| KR | 10-2014-0104196 A | | 8/2014 |
| KR | 10-1501600 B1 | | 3/2015 |

* cited by examiner

FLICKERLESS LED DRIVER DEVICE

CROSS-REFERENCE TO RELATED APPLICATION

This application is a continuation of International Application No. PCT/KR2016/011783, filed Oct. 20, 2016, which claims priority under 35 U.S.C § 119(a) of Patent Application No. 10-2015-0146500, filed on Oct. 21, 2015 in Korea. The entire disclosures of each of the above applications are incorporated herein by reference.

TECHNICAL FIELD

The present invention relates to a flickerless light-emitting diode (LED) driver device having a visual light communication (VLC) function.

BACKGROUND

The statements in this section merely provide background information related to the present invention and do not necessarily constitute prior art.

In general, a light-emitting diode (LED) is a light source having a very high speed of converting an electrical signal into light, e.g., about 30 ns to 250 ns, and may be rapidly switched on or off due to the above-described characteristics. As such, the LED is usable not only for lighting devices but also for visible light communication (VLC).

VLC is communication using visible light wavelengths (e.g., 380 nm to 780 nm), and data is transmitted and received by switching on or off photo diodes (PDs) included in an LED lamp.

Normally, when a light source flickers more than 100 times per second, human eyes do not recognize the flickering. Using the above principle of light, a VLC function may be performed in addition to a basic lighting function.

SUMMARY

The present invention provides a light-emitting diode (LED) driver device capable of suppressing ripple of an emission current by providing a visual light communication (VLC) function to an LED device which emits light by receiving power.

In accordance with some embodiments of the present disclosure, a light-emitting diode (LED) driver device comprises a transformer comprising a primary coil for receiving an alternating-current (AC) voltage, and a secondary coil for generating a first induced voltage induced from the primary coil. The LED driver device further comprises a secondary coil circuit for receiving the first induced voltage and applying a first direct-current (DC) voltage to an LED module. The LED driver device still further comprises a current sensor for sensing a driving current flowing through the secondary coil circuit from the secondary coil. The LED driver device still further comprises a current controller for receiving a signal about the driving current and generating a control signal for controlling an emission current flowing through the LED module. The LED driver device still further comprises a ripple attenuator connected to the LED module to receive a visual light communication (VLC) signal and the control signal, control an emission current corresponding to the VLC signal to flow through the LED module, and suppress ripple of the emission current.

In accordance with some embodiments of the present disclosure, a light-emitting diode (LED) driver device comprises a transformer comprising a primary coil for receiving an alternating-current (AC) voltage, and a first secondary coil and a second secondary coil for generating a first induced voltage and a second induced voltage, respectively, which are induced from the primary coil. The LED driver device further comprises a first secondary coil circuit for receiving the first induced voltage and applying a first direct-current (DC) voltage to an LED module; a second secondary coil circuit for receiving the second induced voltage and generating a second DC voltage; a current sensor for sensing a driving current flowing through the first secondary coil circuit from the first secondary coil; and a current controller for receiving a signal about the driving current and generating a control signal for controlling an emission current flowing through the LED module. The LED driver device still further comprises a second transistor connected to the LED module to receive a visual light communication (VLC) signal and control an emission current corresponding to the VLC signal to flow through the LED module; and a first transistor for receiving the control signal to suppress ripple of the emission current flowing through the LED module.

REFERENCE NUMERALS

| | |
|---|---|
| 100, 200, 300: LED driver device | 110, 210: power input unit |
| 120, 220: transformer | 122, 222: primary coil |
| 124, 224, 324: core | 126: secondary coil |
| 130: secondary coil circuit | 226, 326: first secondary coil |
| 230, 330: first secondary coil circuit | 135, 235, 335: LED module |
| 150, 250, 350: current sensor | 160, 260, 360: current controller |
| 170, 270, 370: ripple attenuator | 180, 280, 390: VLC input unit |
| 228, 328: second secondary coil circuit | 240, 340: second secondary coil |
| 281, 391: VLC controller | 351: amplifier |
| 380: connector | |

DETAILED DESCRIPTION

Hereinafter, the present invention will be described in detail by explaining embodiments of the invention with reference to the attached drawings.

Figure 1:
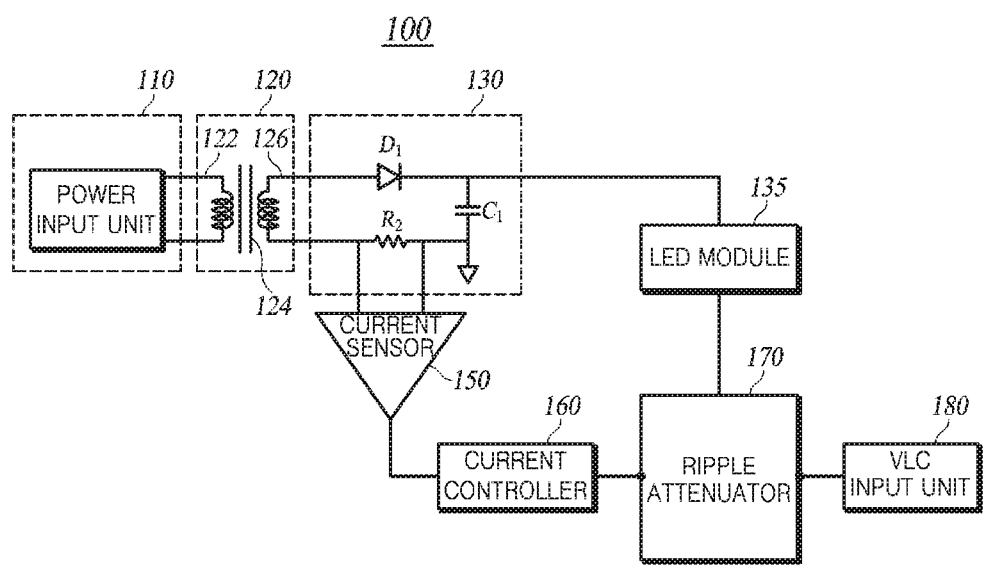
FIG. 1 is a schematic diagram of a light-emitting diode (LED) driver device according to an embodiment.

FIG. 1 is a schematic diagram of a light-emitting diode (LED) driver device 100 according to an embodiment of the present invention.

As illustrated in FIG. 1, the LED driver device 100 according to an embodiment of the present invention includes a power input unit 110, a transformer 120, a secondary coil circuit 130, a current sensor 150, a current controller 160, a ripple attenuator 170, and a visual light communication (VLC) input unit 180. The LED driver device 100 illustrated in FIG. 1 merely corresponds to an embodiment. Not all elements illustrated in FIG. 1 are essential and, in another embodiment, some elements included in the LED driver device 100 may be modified or removed, or new elements may be added.

In FIG. 1, the LED driver device 100 receives a VLC signal and controls a current, which flows through an LED module 135, to correspond to the received VLC signal.

The power input unit 110 is connected to a primary coil 122 of the transformer 120, and applies an alternating-current (AC) voltage to the primary coil 122. An induced voltage (e.g., a first induced voltage) is generated by a secondary coil 126 due to the AC voltage applied to the primary coil 122 by the power input unit 110. Herein, the power input unit 110 applies the AC voltage to the primary coil 122 by setting the magnitude of the AC voltage in such a manner that the first induced voltage may be generated to a desired magnitude in a no-load state when loads of the secondary coil circuit 130, e.g., the LED module 135 and the ripple attenuator 170, are removed.

The transformer 120 serves to increase or reduce a voltage for driving the LED module 135, in which multiple LEDs are connected in series, based on the magnitude of the voltage input to the primary coil 122.

The transformer 120 according to an embodiment includes a core 124 around which coils are wound, the primary coil 122 for receiving the AC voltage, and the secondary coil 126 for generating the first induced voltage induced from the voltage of the primary coil 122. Herein, the core 124 may be produced to a certain thickness by using a magnetic material such as a silicon steel plate, permalloy, or ferrite. The primary and secondary coils 122 and 126 may be wound around the core 124 based on a preset turn ratio. In the transformer 120, the voltage of the secondary coil 126 is induced due to the voltage of the primary coil 122 in proportion to the turn ratio of the primary and secondary coils 122 and 126.

The secondary coil circuit 130 is connected to the secondary coil 126, and receives the first induced voltage induced from the voltage of the primary coil 122 and generated by the secondary coil 126. The secondary coil circuit 130 converts the first induced voltage into a first direct-current (DC) voltage corresponding thereto, and applies the first DC voltage to the loads, e.g., the LED module 135, in which LEDs are connected in series, and the ripple attenuator 170.

The secondary coil circuit 130 has a structure including a first diode $D_1$ having an end connected to a terminal of the secondary coil 126, a second resistor $R_2$ having an end connected to the other terminal of the secondary coil 126, and a first capacitor $C_1$ connected between the other end of the first diode $D_1$ and the other end of the second resistor $R_2$.

The current sensor 150 is connected in parallel to the second resistor $R_2$ of the secondary coil circuit 130. Herein, the second resistor $R_2$ is implemented as an element included in the secondary coil circuit 130 in the above description, but may also be implemented as an element of the current sensor 150.

The current sensor 150 senses a driving current flowing through the secondary coil circuit 130. The current sensor 150 provides a control voltage corresponding to the driving current sensed from the secondary coil circuit 130, to the current controller 160.

In the above description, the current sensor 150 is connected to an end and the other end of the second resistor $R_2$ and senses the driving current flowing through the secondary coil circuit 130, by using a potential difference between the end and the other end of the second resistor $R_2$. However, the current sensor 150 is not limited thereto and may use any other current sensing method, e.g., a Hall sensor (element) method, a fuse-type method, or a non-contact sensing method.

The current sensor 150 outputs a control voltage corresponding to the sensed driving current and provides the control voltage to the current controller 160.

The current controller 160 controls an emission current flowing through the LED module 135, by providing a control signal corresponding to the control voltage to the ripple attenuator 170.

The current controller 160 is connected to the current sensor 150 and the ripple attenuator 170, and the ripple attenuator 170 controls the LED module 135 in such a manner that an emission current corresponding to a VLC signal received from the VLC input unit 180 flows through the LED module 135, and suppresses ripple of the emission current. Herein, the ripple attenuator 170 controls emission of the LED module 135 based on the control signal received from the current controller 160.

The current controller 160 receives the control voltage corresponding to the driving current sensed by the current sensor 150, from the current sensor 150, and outputs the control signal by controlling the magnitude of the control signal based on an increase or decrease of the control voltage. The current controller 160 transmits the control signal to the ripple attenuator 170.

The ripple attenuator 170 receives the control signal from the current controller 160 and operates in a constant current (CC) mode for controlling a current to constantly flow through the LED module 135. Herein, the ripple attenuator 170 prevents overcurrent from flowing through the LED module 135 or a circuit or element in the ripple attenuator 170 due to a short.

The ripple attenuator 170 receives the VLC signal from the VLC input unit 180 and controls an emission current corresponding to the VLC signal to flow through the LED module 135. In addition, the ripple attenuator 170 removes ripple of the emission current corresponding to the VLC signal based on the received control signal.

Figure 2:
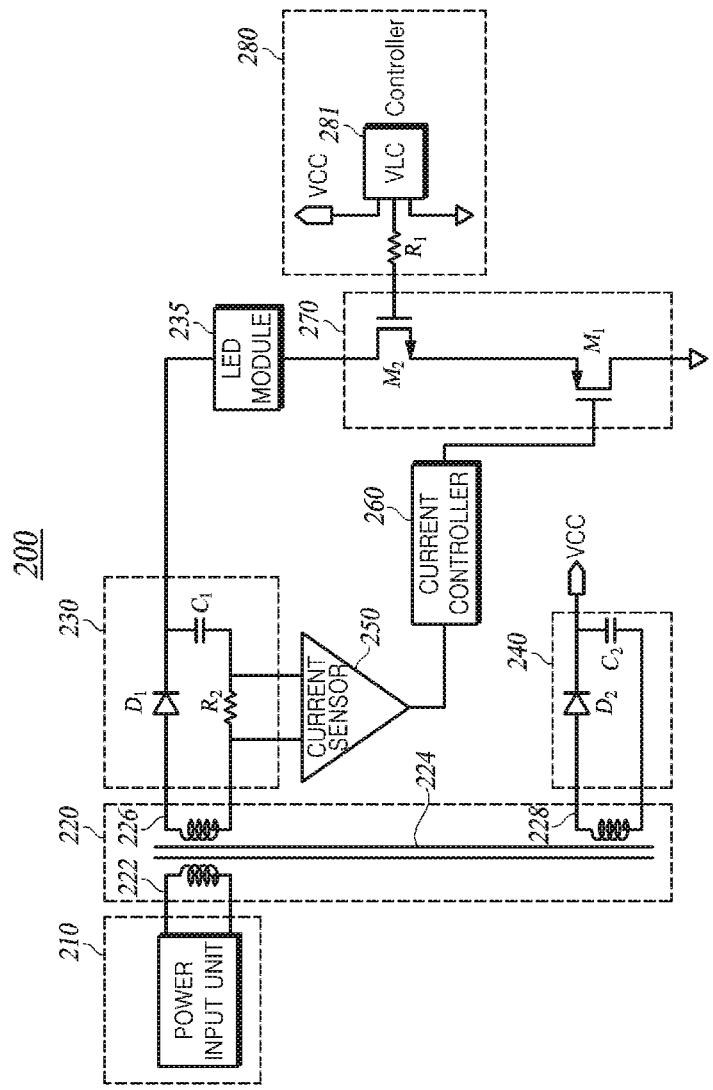
FIG. 2 is a schematic diagram of an LED driver device according to another embodiment.

FIG. 2 is a schematic diagram of an LED driver device 200 according to another embodiment of the present invention.

As illustrated in FIG. 2, the LED driver device 200 according to another embodiment of the present invention includes a power input unit 210, a transformer 220, a first secondary coil circuit 230, a second secondary coil circuit 240, a current sensor 250, a current controller 260, a ripple attenuator 270, and a VLC input unit 280. Not all elements illustrated in FIG. 2 are essential and some elements included in the LED driver device 200 may be modified or removed, or new elements may be added.

The power input unit 210 is connected to a primary coil 222 of the transformer 220, and applies an AC voltage to the primary coil 222. A first induced voltage is induced by a first secondary coil 226 and a second induced voltage is induced by a second secondary coil 228 due to the AC voltage applied to the primary coil 222 by the power input unit 210.

The transformer 220 includes a core 224 around which coils are wound, the primary coil 222 for receiving the AC voltage, and the first and second secondary coils 226 and 228 for generating induced voltages (e.g., the first and second induced voltages) induced from the voltage of the primary coil 222.

The primary coil 222, and the secondary coils 226, and 228 may be wound around the core 224 based on a preset turn ratio. For example, the turn ratio of the primary coil 222, and the secondary coils 226, and 228 may be set to be 1:1:0.5. In the transformer 220, the induced voltages are generated by the first and second secondary coils 226 and 228 due to the voltage of the primary coil 222 in proportion to the turn ratio.

The first secondary coil circuit 230 is connected to the first secondary coil 226, and receives the first induced voltage induced from the voltage of the primary coil 222 and generated by the first secondary coil 226. The first secondary coil circuit 230 converts the first induced voltage into a first DC voltage corresponding thereto, and applies the first DC voltage to loads, e.g., an LED module 235, in which LEDs are connected in series, and the ripple attenuator 270.

The first secondary coil circuit 230 has a structure including a first diode $D_1$ having an end connected to a terminal of the first secondary coil 226, a second resistor $R_2$ having an end connected to the other terminal of the first secondary coil 226, and a first capacitor $C_1$ connected between the other end of the first diode $D_1$ and the other end of the second resistor $R_2$.

The current sensor 250 is connected in parallel to the second resistor $R_2$ of the first secondary coil circuit 230.

The current sensor 250 senses a driving current flowing through the first secondary coil circuit 230. The current sensor 250 transmits a control voltage corresponding to the driving current sensed from the first secondary coil circuit 230, to the current controller 260.

The second secondary coil circuit 240 has a structure including a second diode $D_2$ having an end connected to a terminal of the second secondary coil 228, and a second capacitor $C_2$ connected between the other terminal of the second secondary coil 228 and the other end of the second diode $D_2$.

The second secondary coil circuit 240 converts the induced AC voltage of the first secondary coil circuit 230 into a second DC voltage, and supplies the converted second DC voltage as internal power of the current sensor 250, the current controller 260, and the VLC input unit 280.

The current sensor 250 is connected in parallel to the second resistor $R_2$ of the first secondary coil circuit 230.

The current sensor 250 senses the driving current flowing through the first secondary coil circuit 230. The current sensor 250 outputs a control voltage corresponding to the driving current sensed from the first secondary coil circuit 230, and provides the control voltage to the current controller 260.

The current controller 260 controls an emission current flowing through the LED module 235, by providing a control signal corresponding to the received control voltage to the ripple attenuator 270.

The current controller 260 is connected to the current sensor 250 and the ripple attenuator 270, and the ripple attenuator 270 controls the LED module 235 in such a manner that an emission current corresponding to a VLC signal received from the VLC input unit 280 flows through the LED module 235, and suppresses ripple of the emission current.

The current controller 260 receives the control voltage corresponding to the driving current sensed by the current sensor 250, from the current sensor 250, and controls the magnitude of the control signal based on an increase or decrease of the control voltage.

The ripple attenuator 270 includes a first transistor $M_1$ and a second transistor $M_2$ connected in series to each other. Herein, the LED module 235 and the first and second transistors $M_1$ and $M_2$ are connected in a cascode form.

A current input terminal of the second transistor $M_2$ is connected to the LED module 235. The second transistor $M_2$ receives the VLC signal from the VLC input unit 280 through a control terminal of the second transistor $M_2$, and controls an emission current corresponding to the VLC signal to flow through the LED module 235.

A current input terminal of the first transistor $M_1$ is connected to a current output terminal of the second transistor $M_2$. The first transistor $M_1$ receives the control signal from the current controller 260 through a control terminal of the first transistor $M_1$ and controls ripple of the emission current flowing through the LED module 235.

The VLC input unit 280 includes a VLC controller 281 and a first resistor $R_1$. The VLC controller 281 generates a VLC signal and provides the VLC signal to the control terminal of the second transistor $M_2$. The first resistor $R_1$ is connected between the VLC controller 281 and the control terminal of the second transistor $M_2$ of the ripple attenuator 270, and serves as a damper capable of preventing malfunction of the second transistor $M_2$ by preventing rapid fluctuation in a voltage of the control terminal of the second transistor $M_2$ of the ripple attenuator 270 when the magnitude of the VLC signal rapidly fluctuates.

The first and second transistors $M_1$ and $M_2$ are illustrated as metal-oxide-semiconductor field-effect transistors (MOSFETs) in FIG. 2, but may also be implemented as various transistors such as insulated-gate bipolar transistors (IGBTs) and bipolar junction transistors (BJTs).

Therefore, although the first transistor $M_1$ is illustrated as a p-MOS transistor in FIG. 2, the first transistor $M_1$ is not limited thereto and may also be implemented as various transistors such as an n-MOS transistor and an npn transistor. In addition, although the second transistor $M_2$ is illustrated as an n-MOS transistor in FIG. 2, the second transistor $M_2$ may also be implemented as various transistors such as a p-MOS transistor and a pnp transistor.

When the first or second transistor $M_1$ or $M_2$ is implemented as an n-MOS transistor, a drain terminal of the n-MOS transistor serves as a current input terminal, a source terminal thereof serves as a current output terminal, and a gate terminal thereof serves as a control terminal. Otherwise, when the first or second transistor $M_1$ or $M_2$ is implemented as a p-MOS transistor, a source terminal of the p-MOS transistor serves as a current input terminal, a drain terminal thereof serves as a current output terminal, and a gate terminal thereof serves as a control terminal.

Likewise, when the first or second transistor $M_1$ or $M_2$ is implemented as an NPN BJT, a collector of the NPN BJT may be defined as a current input terminal, an emitter thereof, from which a current is output, may be defined as a current output terminal, and a base thereof may be defined as a control terminal. In the case of a PNP BJT, positions of a current input terminal and a current output terminal are opposite to those of the NPN BJT.

The ripple attenuator 270 receives the control signal of the current controller 260 and operates in a constant current (CC) mode for controlling a current to constantly flow through the LED module 235. In addition, the ripple attenuator 270 prevents overcurrent from flowing through the LED module 235 or a circuit or element in the ripple attenuator 270 due to a short.

The ripple attenuator 270 receives the VLC signal from the VLC input unit 280 and controls an emission current corresponding to the VLC signal to flow through the LED module 235. In addition, the ripple attenuator 270 removes ripple of the emission current corresponding to the VLC signal based on the received control signal.

Figure 3:
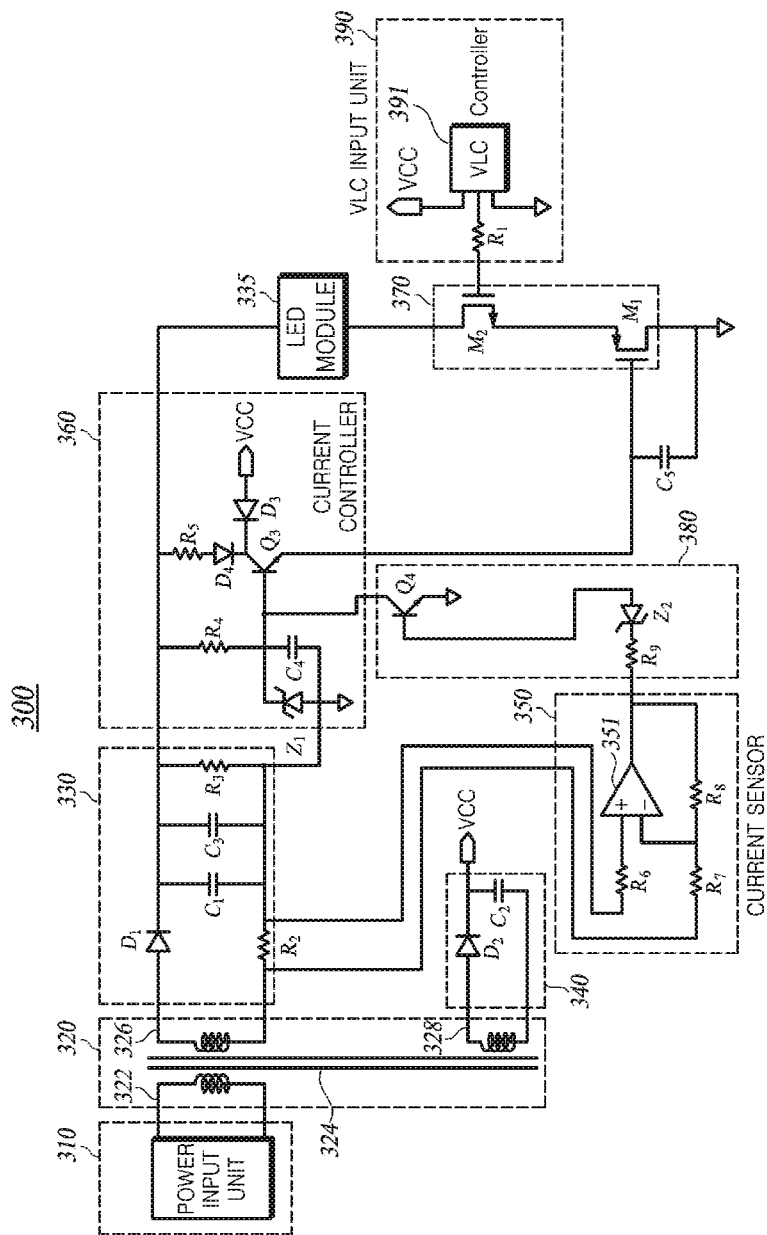
FIG. 3 is a circuit diagram of an LED driver device according to an embodiment.

FIG. 3 is a circuit diagram of an LED driver device 300 according to another embodiment of the present invention.

As illustrated in FIG. 3, the LED driver device 300 may include a power input unit 310, a transformer 320, a first secondary coil circuit 330, a second secondary coil circuit 340, a current sensor 350, a current controller 360, a ripple attenuator 370, a connector 380, and a VLC input unit 390. Not all elements illustrated in FIG. 3 are essential and some elements included in the LED driver device 300 may be modified or removed, or new elements may be added.

The power input unit 310 is connected to a primary coil 322 of the transformer 320, and applies an AC voltage to the primary coil 322. A first induced voltage is generated by a secondary coil 326 and a second induced voltage is generated by a second secondary coil 328 due to the AC voltage applied to the primary coil 322 by the power input unit 310.

The transformer 320 includes a core 324 around which coils are wound, the primary coil 322 for receiving the AC voltage, and the first and second secondary coils 326 and 328 for generating induced voltages (e.g., the first and second induced voltages) induced from the voltage of the primary coil 322.

The primary coil 322, and secondary coils 326, and 328 may be wound around the core 324 based on a preset turn ratio. For example, the turn ratio of the primary coil 322, and secondary coils 326, and 328 may be set to be 1:1:0.5. In the transformer 320, the induced voltages are generated by the first and second secondary coils 326 and 328 due to the voltage of the primary coil 322 in proportion to the turn ratio.

The power input unit 310 applies the AC voltage to the primary coil 322 by setting the magnitude of the AC voltage in such a manner that the first induced voltage may be generated to a desired magnitude in a no-load state when loads of the first secondary coil circuit 330, e.g., an LED module 335, a first transistor $M_1$, and a second transistor $M_2$, are removed.

The first secondary coil circuit 330 is connected to the first secondary coil 326, and receives the first induced voltage induced from the voltage of the primary coil 322 and generated by the first secondary coil 326. The first secondary coil circuit 330 converts the first induced voltage into a first DC voltage corresponding thereto, and applies the first DC voltage to the loads, e.g., the LED module 335, in which multiple LEDs are connected in series, and the first and second transistors $M_1$ and $M_2$.

The first secondary coil circuit 330 has a structure including a first diode $D_1$ having an end connected to a terminal of the first secondary coil 326, a second resistor $R_2$ having an end connected to the other terminal of the first secondary coil 326, a first capacitor $C_1$ connected between the other end of the first diode $D_1$ and the other end of the second resistor $R_2$, a third capacitor $C_3$ connected in parallel to the first capacitor $C_1$, and a third resistor $R_3$ connected in parallel to the third capacitor $C_3$.

The third capacitor $C_3$ is connected between the terminal of the first secondary coil circuit 330, from which the first DC voltage is generated, and a ground (GND) terminal corresponding to the other terminal of the first secondary coil 326, and suppresses a high-frequency component voltage included in the first DC voltage.

The third resistor $R_3$ serves as a bleeder resistor which is connected between the terminal of the first secondary coil circuit 330, from which the first DC voltage is generated, and the GND terminal and allows a constant current to flow through the LED module 335 in order to prevent fluctuation in the voltage applied to the LED module 335 due to fluctuation in an emission current of the LED module 335. Due to the third resistor $R_3$, the LED driver device 300 may be protected when the LED module 335 or the first or second transistor $M_1$ or $M_2$ has an error, e.g., a short or open.

The VLC input unit 390 includes a VLC controller 391 and a first resistor $R_1$. The VLC input unit 390 generates a VLC signal and provides the VLC signal to a control terminal of the second transistor $M_2$. The first resistor $R_1$ serves as a damper capable of preventing malfunction of the second transistor $M_2$ by preventing rapid fluctuation of a voltage of the control terminal of the second transistor $M_2$ of the ripple attenuator 370 when the magnitude of the VLC signal rapidly fluctuates.

The current sensor 350 includes an amplifier 351, a sixth resistor $R_6$, a seventh resistor $R_7$, and an eighth resistor $R_8$.

The second resistor $R_2$ senses a driving current Isens flowing through the first secondary coil circuit 330, and converts the driving current Isens into a sensed voltage Vsens (Vsens=Isens*$R_2$), which is an amplified voltage signal. The sixth and seventh resistors $R_6$ and $R_7$ respectively connected in series to positive and negative input terminals of the amplifier 351 serve to attenuate rapid fluctuation of the sensed voltage sensed by the second resistor $R_2$ and transmit the attenuated voltage to the positive and negative input terminals of the amplifier 351. The eighth resistor $R_8$ is connected between an output terminal and the negative input terminal of the amplifier 351, and a gain of the amplifier 351 may be expressed as a ratio between the seventh and eighth resistors $R_7$ and $R_8$ (Gain=$R_8/R_7$).

Herein, the second resistor $R_2$ may be implemented as an element of the current sensor 350 instead of the first secondary coil circuit 330.

The connector 380 includes a ninth resistor $R_9$, a second Zener diode $Z_2$, and a fourth transistor $Q_4$. The ninth resistor $R_9$ receives the amplified voltage signal output from the current sensor 350, transmits the amplified voltage signal through the second Zener diode $Z_2$ to a control terminal of the fourth transistor $Q_4$, and prevents malfunction of the fourth transistor $Q_4$ by serving as a damper when the amplified voltage signal rapidly fluctuates.

The second Zener diode $Z_2$ supplies a bias voltage to the control terminal of the fourth transistor $Q_4$. The fourth transistor $Q_4$ amplifies the amplified voltage signal output from the current sensor 350 (e.g., a first output voltage), and transmits a second output voltage generated from a current input terminal of the fourth transistor $Q_4$, to the current controller 360.

The current sensor 350 senses a driving current flowing through the first secondary coil circuit 330. The current sensor 350 provides a control voltage corresponding to the driving current sensed from the first secondary coil circuit 330, through the connector 380 to the current controller 360.

The current controller 360 includes a third transistor $Q_3$, a first Zener diode $Z_1$, a fourth resistor $R_4$, a fourth capacitor $C_4$, a third diode $D_3$, and a fifth resistor $R_5$.

The second output voltage amplified by the connector 380 is input to a control terminal of the third transistor $Q_3$, and a current is output from a current output terminal of the third transistor $Q_3$ and is supplied to a control terminal of the first transistor $M_1$. The third diode $D_3$ has a cathode connected to a current input terminal of the third transistor $Q_3$, and an anode connected to a line of a second DC voltage generated by the second secondary coil circuit 340. The third diode $D_3$ prevents a current from flowing into the second secondary coil circuit 340, from which the second DC voltage is generated, when a voltage of the current input terminal of the third transistor $Q_3$ is higher than the second DC voltage.

The fifth resistor $R_5$ is connected between the terminal of the first secondary coil circuit 330, from which the first DC voltage is generated, and the current input terminal of the third transistor $Q_3$, and restricts the voltage of the current input terminal of the third transistor $Q_3$. A fourth diode $D_4$ connected between an end of the fifth resistor $R_5$ and the current input terminal of the third transistor $Q_3$ may be used to prevent a current from flowing in a direction from the second secondary coil circuit 340, from which the second DC voltage is generated, toward the terminal of the first secondary coil circuit 330, from which the first DC voltage is generated, when the magnitude of the first DC voltage is less than that of the second DC voltage due to a short of the LED module 335.

The fourth resistor $R_4$ is connected between the terminal of the first secondary coil circuit 330, from which the first DC voltage is generated, and the control terminal of the third transistor $Q_3$, and supplies a bias voltage to the third transistor $Q_3$.

The first Zener diode $Z_1$ has a cathode connected to the control terminal of the third transistor $Q_3$, and an anode connected to the GND terminal, and restricts the bias voltage of the third transistor $Q_3$.

The fourth capacitor $C_4$ is connected between the control terminal of the third transistor $Q_3$ and the GND terminal and suppresses temporary fluctuation of a voltage of the control terminal of the third transistor $Q_3$.

The current sensor 350 outputs a control voltage corresponding to the sensed driving current and provides the control voltage through the connector 380 to the current controller 360. The connector 380 receives the control voltage, generates an amplified voltage signal by amplifying the control voltage, and provides the amplified voltage signal to the current controller 360.

The current controller 360 generates a control signal corresponding to the amplified voltage signal and provides the control signal to the ripple attenuator 370, and the ripple attenuator 370 suppresses ripple of an emission current flowing through the LED module 335, based on the received control signal.

The ripple attenuator 370 receives the control signal output from the current controller 360, and operates in a constant current (CC) mode for controlling a current to constantly flow through the LED module 335. In addition, when at least one element among the LED module 335 and the first and second transistors $M_1$ and $M_2$ is shorted, the ripple attenuator 370 controls the first transistor $M_1$ to prevent overcurrent from flowing through the shorted element, thereby controlling the magnitude of the current. Herein, at least one element among the LED module 335 and the first and second transistors $M_1$ and $M_2$ may be shorted when the first DC voltage is excessively high or when the at least one element among the LED module 335 and the first and second transistors $M_1$ and $M_2$ is burnt, but the present invention is not limited thereto.

For example, when the first DC voltage is excessively high, the third transistor $Q_3$ is controlled in such a manner that a high current flows through the third transistor $Q_3$. As a high current flows through the third transistor $Q_3$, a high voltage is applied to a gate terminal of the first transistor $M_1$. Therefore, when a high voltage is applied to the gate of the first transistor $M_1$ as described above, a current flowing through the LED module 335 and the first and second transistors $M_1$ and $M_2$ may be restricted by restricting the current flowing through the first transistor $M_1$.

For reference, although the third transistor $Q_3$ is illustrated as an npn transistor, the present invention is not limited thereto and various transistors such as various types of MOSFETs may be used.

A fifth capacitor $C_5$ is connected between the control terminal of the first transistor $M_1$ and the GND terminal and controls the magnitude of a ripple current flowing through the first transistor $M_1$ by applying a certain delay to the control signal supplied to the control terminal of the first transistor $M_1$.

The ripple attenuator 370 receives the VLC signal from the VLC input unit 390, controls an emission current corresponding to the VLC signal to flow through the LED module 335 and the first and second transistors $M_1$ and $M_2$ which are connected in a cascode form, and removes ripple of the emission current due to the VLC signal. The magnitude of the ripple to be removed is determined based on a variation in an on-state drain-source resistance value RDSon of the first transistor $M_1$. If the ripple current to be removed has a large value, a large loss occurs in the first transistor $M_1$. The large loss in the first transistor $M_1$ causes heating of the first transistor $M_1$ and thus increases the temperature of the first transistor $M_1$.

As described above, according to the embodiments of the present invention, an LED module may operate in a constant current (CC) mode based on a control signal corresponding to a driving current sensed from a secondary coil of a transformer which supplies power to the LED module.

In addition, an LED driver device may receive a VLC signal and a current control signal, control an emission current corresponding to the VLC signal to flow through the LED module, and suppress ripple (or flicker) of the emission current.

Although exemplary embodiments of the present disclosure have been described for illustrative purposes, those skilled in the art will appreciate that various modifications, additions and substitutions are possible, without departing from the idea and scope of the claimed invention. Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

What is claimed is:

1. A light-emitting diode (LED) driver device comprising:
   a transformer comprising a primary coil for receiving an alternating-current (AC) voltage, and a secondary coil for generating a first induced voltage induced from the primary coil;
   a secondary coil circuit for receiving the first induced voltage and applying a first direct-current (DC) voltage to an LED module;
   a current sensor for sensing a driving current flowing through the secondary coil circuit from the secondary coil;
   a current controller for receiving a signal about the driving current and generating a control signal for controlling an emission current flowing through the LED module; and
   a ripple attenuator connected to the current controller to receive the control signal, connected to a visual light communication (VLC) input unit to receive a VLC signal, and connected to the LED module to control an emission current corresponding to the VLC signal to flow through the LED module and suppress ripple of the emission current;
   wherein the current sensor comprises:
   an amplifier for amplifying a voltage;
   a sixth resistor connected between an end of a second resistor of the secondary coil circuit and a positive input terminal of the amplifier;

a seventh resistor connected between another end of the second resistor and a negative input terminal of the amplifier; and an eighth resistor connected between an output terminal and the negative input terminal of the amplifier in such a manner that a gain of the amplifier, which is expressed as a ratio between the seventh and eighth resistors, is output as a first output voltage from the output terminal.

2. The LED driver device according to claim 1, wherein the current sensor outputs a control voltage corresponding to the sensed driving current as the signal about the driving current and transmits the control voltage to the current controller, and wherein the current controller receives the control voltage and controls a magnitude of the control signal based on an increase or decrease of the control voltage.

3. The LED driver device according to claim 1, further comprising a connector comprising:

a ninth resistor having an end connected in series to the output terminal of the amplifier;

a second Zener diode having a cathode connected to another end of the ninth resistor; and a fourth transistor having a control terminal connected to an anode of the second Zener diode, in such a manner that an amplified voltage signal obtained by amplifying the first output voltage is generated from a current input terminal of the fourth transistor, wherein the connector transmits the amplified voltage signal to the current controller.

4. The LED driver device according to claim 3, wherein the current controller comprises:

a third transistor having a control terminal to which the amplified voltage signal is input;

a first Zener diode having a cathode connected to the control terminal of the third transistor and an anode connected to a ground (GND) terminal to supply a bias voltage of the third transistor;

a fourth resistor connected between a terminal, from which the first DC voltage is generated, and the control terminal of the third transistor to supply the bias voltage of the third transistor;

a fourth capacitor connected between the control terminal of the third transistor and the GND terminal to suppress temporary fluctuation of a voltage of the control terminal of the third transistor; and a fifth resistor connected between the terminal, from which the first DC voltage is generated, and a current input terminal of the third transistor to restrict a voltage of the current input terminal of the third transistor, and wherein the control signal is generated from a current output terminal of the third transistor.

5. The LED driver device according to claim 1, further comprising a third capacitor connected between a terminal, from which the first DC voltage is generated, and a GND terminal to suppress a high-frequency component voltage of the first DC voltage.

6. The LED driver device according to claim 1, further comprising a third resistor serving as a bleeder resistor which is connected between a terminal, from which the first DC voltage is generated, and a GND terminal and allows a constant current to flow through the LED module in order to prevent voltage fluctuation of the LED module due to fluctuation in the emission current of the LED module.

7. The LED driver device according to claim 1, wherein the ripple attenuator comprises:

a second transistor having a current input terminal connected to the LED module, and a control terminal for receiving the VLC signal, to control an emission current corresponding to the VLC signal to flow through a current output terminal; and a first transistor for receiving the control signal to suppress ripple of the emission current.

8. A light-emitting diode (LED) driver device comprising:

a transformer comprising a primary coil for receiving an alternating-current (AC) voltage, and a first secondary coil and a second secondary coil for generating a first induced voltage and a second induced voltage, respectively, which are induced from the primary coil;

a first secondary coil circuit for receiving the first induced voltage and applying a first direct-current (DC) voltage to an LED module;

a second secondary coil circuit for receiving the second induced voltage and generating a second DC voltage;

a current sensor for sensing a driving current flowing through the first secondary coil circuit from the first secondary coil;

a current controller for receiving a signal about the driving current and generating a control signal for controlling an emission current flowing through the LED module;

a second transistor connected to a visual light communication (VLC) input unit to receive a VLC signal, and connected to the LED module to control an emission current corresponding to the VLC signal to flow through the LED module; and a first transistor for receiving the control signal to suppress ripple of the emission current flowing through the LED module;

wherein the current controller comprises:

a third transistor having a control terminal to which the signal about the driving current is input;

a third diode having a cathode connected to a current input terminal of the third transistor, and an anode connected to a line of the second DC voltage, to block a current from flowing in a direction toward the line of the second DC voltage when a voltage of the current input terminal of the third transistor is higher than the second DC voltage;

a first Zener diode having a cathode connected to the control terminal of the third transistor and an anode connected to a ground (GND) terminal to supply a bias voltage of the third transistor;

a fourth resistor connected between a terminal, from which the first DC voltage is generated, and the control terminal of the third transistor to supply the bias voltage of the third transistor;

a fourth capacitor connected between the control terminal of the third transistor and the GND terminal to suppress temporary fluctuation of a voltage of the control terminal of the third transistor; and a fifth resistor connected between the terminal, from which the first DC voltage is generated, and a current input terminal of the third transistor to restrict a voltage of the current input terminal of the third transistor, wherein the control signal is generated from a current output terminal of the third transistor.

9. The LED driver device according to claim 8, wherein the LED module and the first and second transistors are connected in a cascode form, wherein the first transistor has a control terminal to which the control signal generated by the current controller is input, a current input terminal connected to a current output terminal of the second transistor, and a current output terminal connected to a ground (GND) terminal, to suppress ripple of a current flowing through the LED module, and wherein the second transistor has a current input terminal connected to the LED module, and a control terminal for receiving the VLC signal, to control an emission current corresponding to the VLC signal to flow through the LED module.

10. The LED driver device according to claim 9, wherein a magnitude of ripple to be removed is determined based on a variation in an on-state resistance value of the first transistor.

11. The LED driver device according to claim 8, further comprising a third resistor serving as a bleeder resistor which is connected between a terminal, from which the first DC voltage is generated, and a GND terminal and allows a constant current to flow through the LED module in order to prevent voltage fluctuation due to current fluctuation of the LED module and the first and second transistors.

12. The LED driver device according to claim 8, further comprising a fifth capacitor connected between a control terminal of the first transistor and a GND terminal to control a magnitude of the ripple of the emission current by applying a delay to the control signal.

13. The LED driver device according to claim 8, wherein the current controller receives the second DC voltage and supplies power to the third transistor when the LED module or the first or second transistor is shorted.

* * * * *